United States Patent
Mackey et al.

(10) Patent No.: US 7,545,289 B2
(45) Date of Patent: Jun. 9, 2009

(54) CAPACITIVE SENSING USING A REPEATED PATTERN OF SENSING ELEMENTS

(75) Inventors: Bob Lee Mackey, Santa Clara, CA (US); Mykola Golovchenko, Santa Clara, CA (US)

(73) Assignee: Synaptics Incorporated, Santa Clara, CA (US)

( * ) Notice: Subject to any disclaimer, the term of this patent is extended or adjusted under 35 U.S.C. 154(b) by 401 days.

(21) Appl. No.: 11/488,742

(22) Filed: Jul. 17, 2006

(65) Prior Publication Data

US 2008/0024329 A1  Jan. 31, 2008

(51) Int. Cl.
*H03M 11/00* (2006.01)
(52) U.S. Cl. .................. 341/20; 345/168; 345/173; 341/33; 324/678; 324/660; 324/658; 178/18.01; 178/18.06
(58) Field of Classification Search .......... 341/20, 341/22, 33; 345/173, 168; 324/660, 658; 324/678; 178/18.01, 18.06
See application file for complete search history.

(56) References Cited

U.S. PATENT DOCUMENTS

| | | | | |
|---|---|---|---|---|
| 5,933,102 | A * | 8/1999 | Miller et al. | 341/33 |
| 6,288,707 | B1 * | 9/2001 | Philipp | 345/168 |
| 6,297,811 | B1 * | 10/2001 | Kent et al. | 345/173 |
| 6,496,053 | B1 | 12/2002 | Daubenspeck et al. | |
| 6,657,616 | B2 * | 12/2003 | Sims | 345/173 |
| 6,794,728 | B1 | 9/2004 | Kithil | |
| 7,001,785 | B1 | 2/2006 | Chen | |
| 7,282,139 | B2 * | 10/2007 | Espinoza et al. | 208/108 |
| 2005/0270039 | A1 * | 12/2005 | Mackey | 324/660 |
| 2007/0176608 | A1 * | 8/2007 | Mackey et al. | 324/660 |

OTHER PUBLICATIONS

ISA/US, International Search Report and Written Opinion for International Application No. PCT/US2007/015880, 9 pages, Dec. 12, 2007.

* cited by examiner

*Primary Examiner*—Albert K Wong

(57) ABSTRACT

A repeated pattern of sensing elements can be used to indicate an unambiguous position along an axis in a sensing region. For example, different-sized sensing elements can be arranged in a repeating pattern, and the relative measures of their respective output signals can be used to identify a position in the sensing region.

18 Claims, 8 Drawing Sheets

700

RECEIVE A FIRST MEASURE OF A SENSOR SIGNAL OUTPUT ON A FIRST ELECTRICAL CONDUCTOR COUPLED TO DIFFERENT-SIZED FIRST SENSING ELEMENTS.
710

RECEIVE A SECOND MEASURE OF A SENSOR SIGNAL OUTPUT ON A SECOND ELECTRICAL CONDUCTOR COUPLED TO DIFFERENT-SIZED SECOND SENSING ELEMENTS.
720

RECEIVE A THIRD MEASURE OF A SENSOR SIGNAL OUTPUT ON A THIRD ELECTRICAL CONDUCTOR COUPLED TO DIFFERENT-SIZED THIRD SENSING ELEMENTS.
730

DETERMINE AN UNAMBIGUOUS POSITION USING THE FIRST, SECOND AND THIRD MEASURES.
740

FIG. 7

CAPACITIVE SENSING USING A REPEATED PATTERN OF SENSING ELEMENTS

BACKGROUND

Computing devices have become integral tools used in a wide variety of different applications. Computing devices are finding new applications as a result of advances in hardware technology and rapid development in software technology. Furthermore, the functionality of a computing device is dramatically enhanced by coupling these types of stand-alone devices together to form a networking environment.

Conventional computing devices enable a user to input a choice or a selection in different ways. For example, a user can use an alphanumeric keyboard communicatively connected to the computing device to indicate a choice or selection. Additionally, a user can use a cursor control device communicatively connected to the computing device to indicate a choice. Also, a user can use a microphone communicatively connected to the computing device to audibly indicate a particular selection. Moreover, touch sensing technology can be used to provide an input selection to a computing device or other type of electronic device.

Within the broad category of touch sensing technology there exist capacitive sensing touch sensors. Among conventional capacitive touch sensors, there are different sensing technologies. For example, one sensing technology involves the use of sensing electrodes formed in triangular shapes, where the direction of each triangle point alternates. However, there are disadvantages associated with this technique. For instance, one of the disadvantages is that as a finger (or object) moves towards the wide end of a first triangular shaped electrode and the narrow point of a second triangular shaped electrode, the narrow point electrode does not provide a quality signal because of its inherent signal-to-noise ratio. As such, this can be referred to as sensing geometry that induces signal-to-noise ratio concerns.

Another sensing technology uses a grid of conductive elements that cross over one another. While this design offers ease of signal interpretation, it also has the disadvantage of higher manufacturing cost.

Another factor to consider in the design of a capacitive sensing apparatus is that the sensed position of a finger or object relative to the touch sensor should be unambiguous. That is, for example, the response of the sensing apparatus to a finger at any location on a touch sensor should be different from the response at other locations on the touch sensor.

Thus, a capacitive sensing apparatus that addresses one or more of the above-mentioned issues would be advantageous.

SUMMARY

Embodiments in accordance with the present invention pertain to capacitive sensing apparatuses that address one or more of the issues stated above. According to embodiments of the present invention, a repeated pattern of sensing elements can be used to indicate an unambiguous position along an axis in a sensing region. For example, different-sized sensing elements can be arranged in a repeating pattern, and the relative measures of their respective output signals can be used to identify a position in the sensing region.

In one embodiment, different-sized first sensing elements are coupled to a first electrical conductor, different-sized second sensing elements are coupled to a second electrical conductor, and different-sized third sensing elements are coupled to a third electrical conductor. In one such embodiment, the first sensing elements, the second sensing elements and the third sensing elements are arranged stripe-like in a repeating pattern along an axis in a sensing region. A first measure of a sensor signal output on the first electrical conductor corresponds at least in part to the size of a first sensing element proximate to an object. A second measure of a sensor signal output on the second electrical conductor corresponds at least in part to the size of a second sensing element proximate to the object. A third measure of a sensor signal output on the third electrical conductor corresponds at least in part to the size of a third sensing element proximate to the object. The first, second and third measures together indicate an unambiguous position along an axis in the sensing region.

In one such embodiment, the repeating pattern includes, in order, one of the first sensing elements, one of the second sensing elements, and one of the third sensing elements. In another such embodiment, the repeating pattern includes, in order, one of the first sensing elements, one of the third sensing elements, one of the second sensing elements, and another one of the third sensing elements.

BRIEF DESCRIPTION OF THE DRAWINGS

FIG. 7 is a flowchart of a method that can be implemented using a capacitive sensing apparatus according to an embodiment of the present invention.

The drawings referred to in this description should not be understood as being drawn to scale except if specifically noted.

DETAILED DESCRIPTION

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
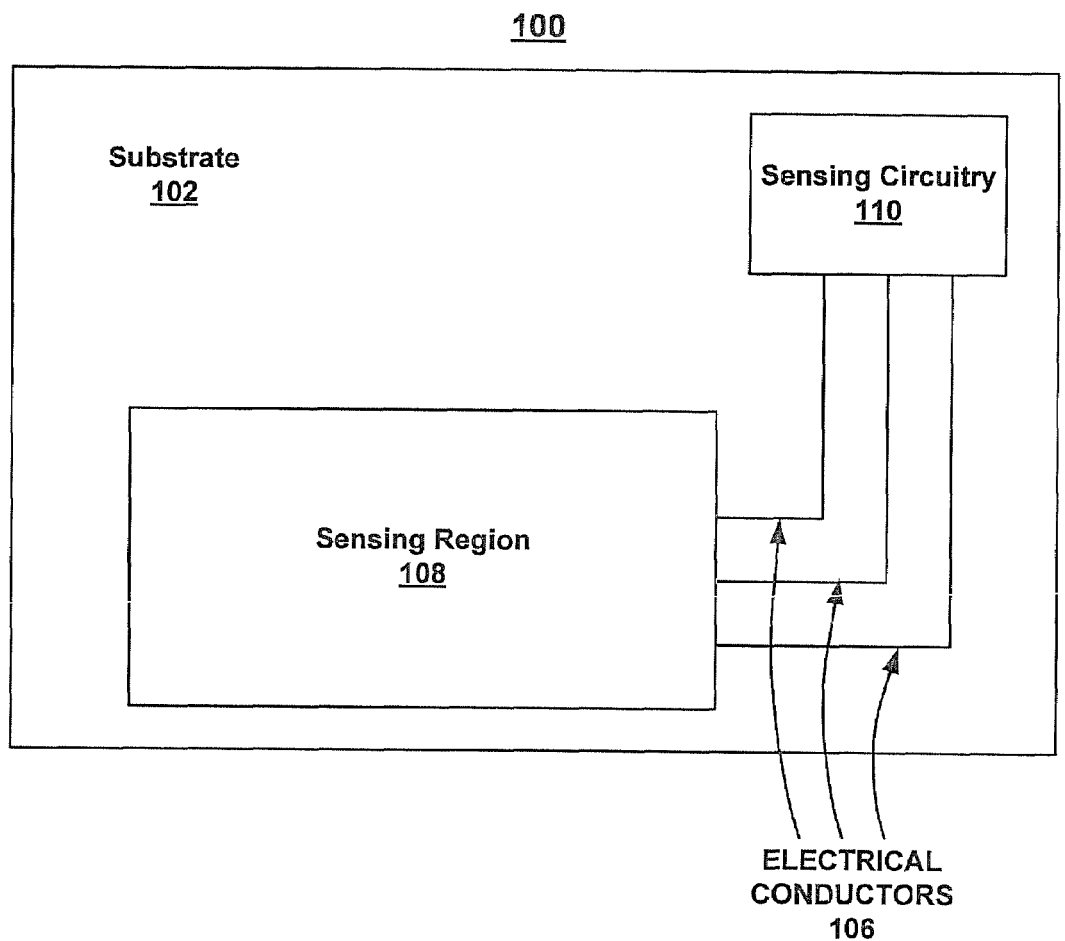
FIG. 1 is a block diagram of an example capacitive touch sensor device according to embodiments of the invention.

FIG. 1 is a plan view of an example two-dimensional capacitive sensor apparatus 100 that can be implemented using one or more embodiments of the present invention. The capacitive sensor apparatus 100 can be utilized to communicate user input (e.g., using a user's finger or a probe) to a computing device or other electronic device. For example, capacitive sensor apparatus 100 can be implemented as a capacitive touch sensor device that can be placed over an underlying image or an information display device (not shown). In this manner, a user would view the underlying image or information display by looking through the substantially transparent sensing region 108 of capacitive sensor apparatus 100 as shown. One or more embodiments in accordance with the present invention can be incorporated with a capacitive touch sensor device similar to capacitive sensor apparatus 100.

The capacitive sensor apparatus 100 when implemented as a touch sensor can include a substantially transparent substrate 102 on which electrically conductive coupling traces 106 (also referred to herein as electrical conductors) are patterned or formed. Electrical conductors 106 can be utilized for coupling any sensing elements (see the following figures for examples) or conductive traces that would form a sensing region 108 with sensing circuitry 110, thereby enabling the operation of capacitive sensor apparatus 100. Electrical conductors 106 may each include one or more conductive coupling elements or traces. Embodiments of sensing element patterns in accordance with the invention, illustrated in the following figures, can be implemented to form sensing region 108.

Within FIG. 1, the capacitive sensor apparatus 100 can be implemented as a capacitive sensing device. For example, substrate 102 of capacitive sensor apparatus 100 can be implemented with, but is not limited to, one or more opaque materials that are utilized as a substrate for a capacitive sensing device.

Furthermore, the sensing region 108 of FIG. 1 is not necessarily limited to the use of a single sensor pattern. In other words, multiple sensors utilizing the same or different sensor patterns can be placed adjacent to each other within sensing region 108. Also, sensing region 108 is not limited to a rectilinear shape. For example, sensing region 108 may be curved or round in shape.

Figure 2:
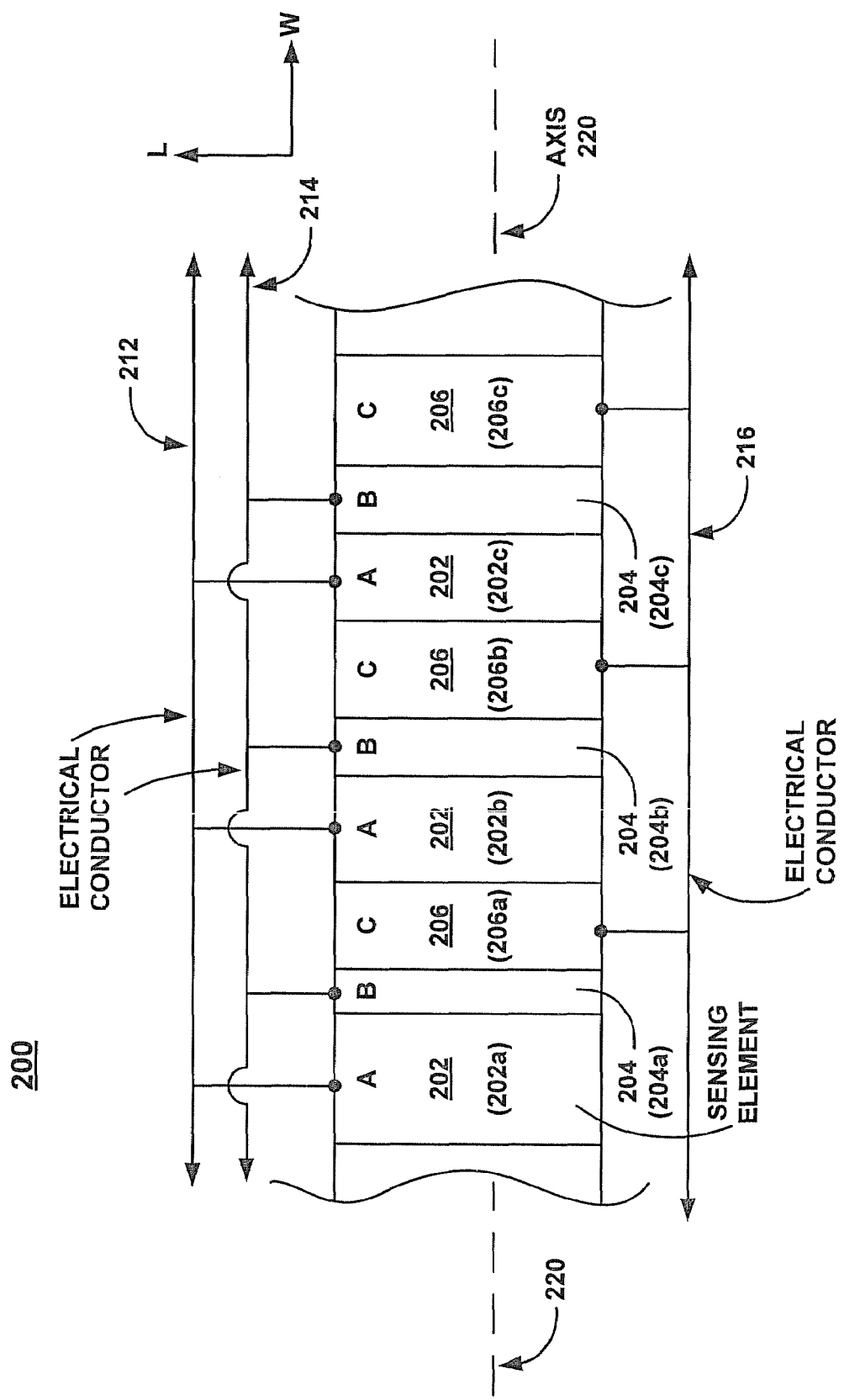
FIG. 2 is a block diagram of a portion of a capacitive sensing apparatus according to one embodiment of the present invention.

FIG. 2 is a block diagram of a portion of a capacitive sensing apparatus 200 according to one embodiment of the present invention. With reference also to FIG. 1, the portion of capacitive sensing apparatus 200 shown in FIG. 2 corresponds to a portion of sensing region 108, and electrical conductors 212, 214 and 216 correspond to (or are coupled to) electrical conductors 106.

The capacitive sensing apparatus 200 of FIG. 2 includes a number of sensing elements 202, 204 and 206. The set of sensing elements 202 is coupled to the same electrical conductor 212; the sensing elements 202 are also identified using the letter A. The set of sensing elements 204 is coupled to the same electrical conductor 214; the sensing elements 204 are also identified using the letter B. The set of sensing elements 206 is coupled to the same electrical conductor 216; the sensing elements 206 are also identified using the letter C. In the example of FIG. 2, the sensing elements 202, 204 and 206 are arranged in a repeating pattern (ABC/ABC/ . . . ). Although three sets of sensing elements, coupled respectively to three electrical conductors, are described, the present invention is not so limited. For example, sensing elements can be arranged in a repeating ABCD pattern where the sensing elements identified using the letter D are coupled to the same electrical conductor, a repeating ABCDE pattern where the sensing elements identified using the letter E are coupled to the same electrical conductor, and so on.

The sensing elements 202, 204 and 206 are arranged in a "stripe-like" manner. That is not to say that the sensing elements 202, 204 and 206 are, as individual elements, shaped as a stripe (that is, the sensing elements do not necessarily have a length that exceeds their width), but that the sensing elements are, in one embodiment, arranged side-by-side. The sets of sensing elements 202, 204 and 206 can also be described as interdigitated, in that each set of sensing elements is interdigitated with the other sets (e.g., the set including sensing elements 202 is interdigitated with the set that includes sensing elements 204 and 206, the set of sensing elements 204 is interdigitated with the set that includes sensing elements 202 and 206, and so on). In one embodiment, adjacent sensing elements are electrically isolated from one another.

In the example of FIG. 2, the sensing elements in the set of sensing elements that is coupled to the electrical conductor 212 (e.g., sensing elements 202) have different widths (compared to other sensing elements in the set) and substantially the same length, the sensing elements in the set of sensing elements that is coupled to the electrical conductor 214 (e.g., sensing elements 204) have different widths (compared to other sensing elements in the set) and substantially the same length, and the sensing elements in the set of sensing elements that is coupled to the electrical conductor 216 (e.g., sensing elements 206) have different widths (compared to other sensing elements in the set) and substantially the same length, where the width dimension is indicated as W and the length dimension is indicated as L. For example, sensing element 202a is wider than sensing element 202b, which in turn is wider than sensing element 202c. Also, sensing element 204a is narrower than sensing element 204b, which in turn is narrower than sensing element 204c, and sensing element 206a is narrower than sensing element 206b, which in turn is narrower than sensing element 206c.

With respect to the orientation of FIG. 2, in one embodiment, the widths of sensing elements in some sets increase from left-to-right, while the widths of sensing elements in other sets decrease from left-to-right (where "set" refers to a set of sensing elements coupled to the same electrical conductor). There is, however, a minimum width as well as a maximum width for the sensing elements. As the sensing elements in a set decrease in width toward the minimum, if the minimum width is reached, then the sensing elements in the set increase in width toward the maximum. Similarly, as the sensing elements in a set increase in width toward the maximum, if the maximum width is reached, then the sensing elements in the set decrease in width toward the minimum. Note that the minimum and maximum widths within each set can occur anywhere along the axis 220.

In one embodiment, the widths of sensing elements in a pattern such as that exemplified in FIG. 2 can be expressed as:

$W_A = W_o + W_m * \sin(\theta)$;

$W_B = W_o + W_m * \sin(\theta + 120 \text{ degrees})$; and $W_C = W_o + W_m * \sin(\theta + 240 \text{ degrees})$;

where $W_o$ and $W_m$ are constants and $W_A$, $W_B$ and $W_C$ are the widths of sensing elements 202, 204 and 206, respectively, and where the length of capacitive sensing apparatus 200 along the axis 220 is expressed in terms of $\theta$ degrees.

A position of an object (e.g., a finger or probe) along the axis 220 can be determined using the relative strengths of signals on the electrical conductors 212, 214 and 216. For example, if an object such as a user's finger is in proximity to (or in contact with) capacitive sensing apparatus 200, a capacitance (or current, voltage, etc.) above a background amount (which may be zero or negligible) is induced in some subset of the sensing elements 202, 204 and 206 and conducted via electrical conductors 212, 214 and 216 to sensing circuitry 110 (FIG. 1). The size of the subset depends on the relative sizes of the sensing elements and the object being sensed. The measures of the outputs on electrical conductors 212, 214 and 216 correspond to (e.g., are proportional to) the widths of the sensing elements 202, 204 and 206 in proximity to the object.

In one embodiment, the combination of widths of sensing elements in a group of contiguous sensing elements is unique to that group, no matter how that group is delimited. That is, the combination of sensing element widths in a group consisting of contiguous sensing elements 202*a*, 204*a* and 206*a*, for example, is unique to that group. Note that, although in the example of FIG. 2 the sensing elements are arranged in a repeating ABC pattern, in one embodiment the combination of widths of sensing elements is not repeated at other points along axis 220. That is, for example, the unique combination of sensing element widths in the group consisting of contiguous sensing elements 202*a*, 204*a* and 206*a* does not appear elsewhere along axis 220. Therefore, in such an embodiment, an unambiguous position along the axis 220 can be determined using the respective measures of output on electrical conductors 212, 214 and 216, because the relative measures of the outputs on the electrical conductors 212, 214 and 216 correspond to the widths of the subset of sensing elements in proximity to the object, and because the widths of the subset of sensing elements in proximity to the object are unique to that particular subset and hence to a particular position among the entire set of sensing elements.

Figure 3:
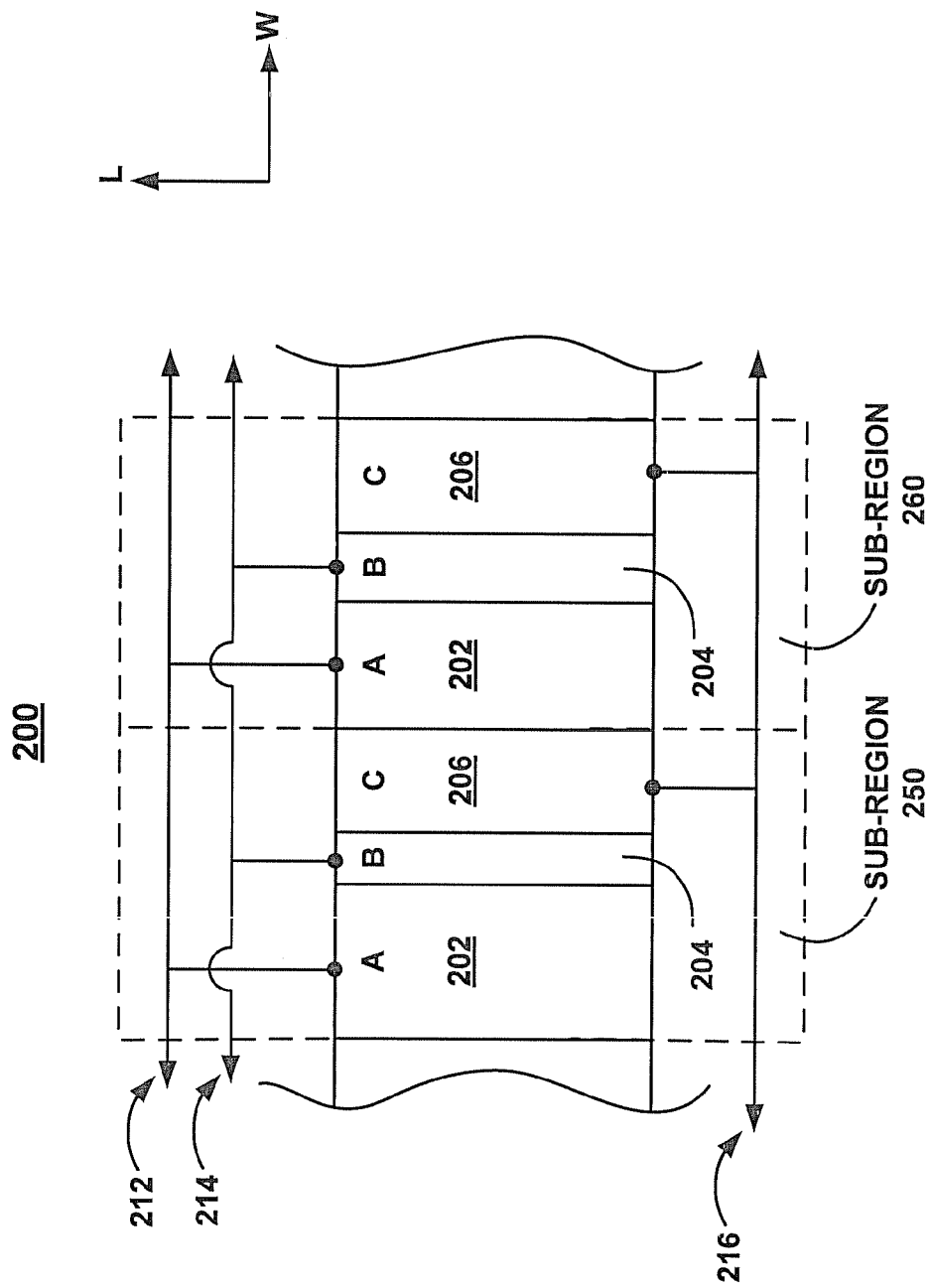
FIG. 3 is a block diagram of a portion of a capacitive sensing apparatus according to another embodiment of the present invention.

FIG. 3 is a block diagram of a portion of the capacitive sensing apparatus 200 according to another embodiment of the present invention. In the example of FIG. 3, the capacitive sensing apparatus 200 includes, in essence, a number of non-overlapping and contiguous cells or sub-regions such as sub-regions 250 and 260. The sub-regions 250 and 260 are abstractions that can be delimited in a different manner than shown by FIG. 3. In general, in the example of FIG. 3, a sub-region includes a group of contiguous sensing elements, where the group includes some number of the sensing elements 202 coupled to the same electrical conductor 212, that same number of the sensing elements 204 coupled to the same electrical conductor 214, and that same number of the sensing elements 206 coupled to the same electrical conductor 216. For example, sub-region 250 includes one each of the sensing elements labeled A, B and C, and similarly sub-region 260 includes one each of the sensing elements labeled A, B and C. Alternatively, a sub-region can be defined as including two or more of each of the sensing elements labeled A, B and C. As mentioned above, embodiments in accordance with the present invention are not limited to three sets of sensor elements A, B and C. Thus, for example, if there are four sets of sensor elements A, B, C and D arranged in a repeating ABCD pattern, a sub-region can be defined as including one sensing element, or two or more sensing elements, from each of the sets A, B, C and D.

In one embodiment, the width of each sub-region 250 and 260 in capacitive sensing apparatus 200 is substantially the same from one sub-region to the next. Also, because in the examples of FIGS. 2 and 3 each of the sensing elements 202, 204 and 206 has substantially the same length, the surface areas of the sub-regions 250 and 260 are essentially the same. By balancing the surface areas in this manner, each of the sub-regions 250 and 260 would be expected to have approximately the same total background measure (capacitance, current, voltage, etc.) if measured in the absence of an object (e.g., a user's finger or a probe), where the total background measure refers to the total (combined) measures of signal strength on all of the electrical conductors 212, 214 and 216.

The sub-regions 250 and 260 can also be abstracted to include a segment of each of the electrical conductors 212, 214 and 216. If the electrical conductors 212, 214 and 216 are not "hidden" (e.g., shielded or buried) in some manner, an object in proximity to the sensing region may induce a capacitance not just in the sensing elements 202, 204 and 206 but also in the electrical conductors 212, 214 and 216. Thus, when considering the surface area of the sensing elements within a sub-region 250 or 260, the contribution of the electrical conductors 212, 214 and 216 may also be included. In one embodiment, the widths of the electrical conductors 212, 214 and/or 216 can be varied as a function of their lengths, so that each of the sub-regions 250 and 260 would be expected to have approximately the same total background measure (capacitance, current, voltage, etc.) if measured in the absence of an object.

Although the examples of FIGS. 2 and 3 are discussed in the context of sensing elements of different widths, the present invention is not so limited. Sensing elements of different lengths and substantially the same width can instead be used to indicate position in a manner such as that described above. Also, sensing elements that have different surface areas can be used (where "surface" refers to the surface facing the object to be sensed). Furthermore, sensing elements of substantially the same length and width, but at different distances (depths) from the sensing surface of sensing apparatus 200, can be used (see FIGS. 6A and 6B, for example). Moreover, sensing elements in which length, width and/or depth are varied can be used.

Also, although the examples of FIGS. 2 and 3 are described for sensing elements that continuously increase or decrease in size (e.g., width) from left-to-right (with respect to the orientation of FIGS. 2 and 3), the present invention is not so limited. The sensing elements can be arranged differently based on their sizes such that the combination of sizes of sensing elements in any group of contiguous sensing elements is unique to that group, while also paying heed to the aforementioned repeating (e.g., ABC) pattern.

Figure 4:
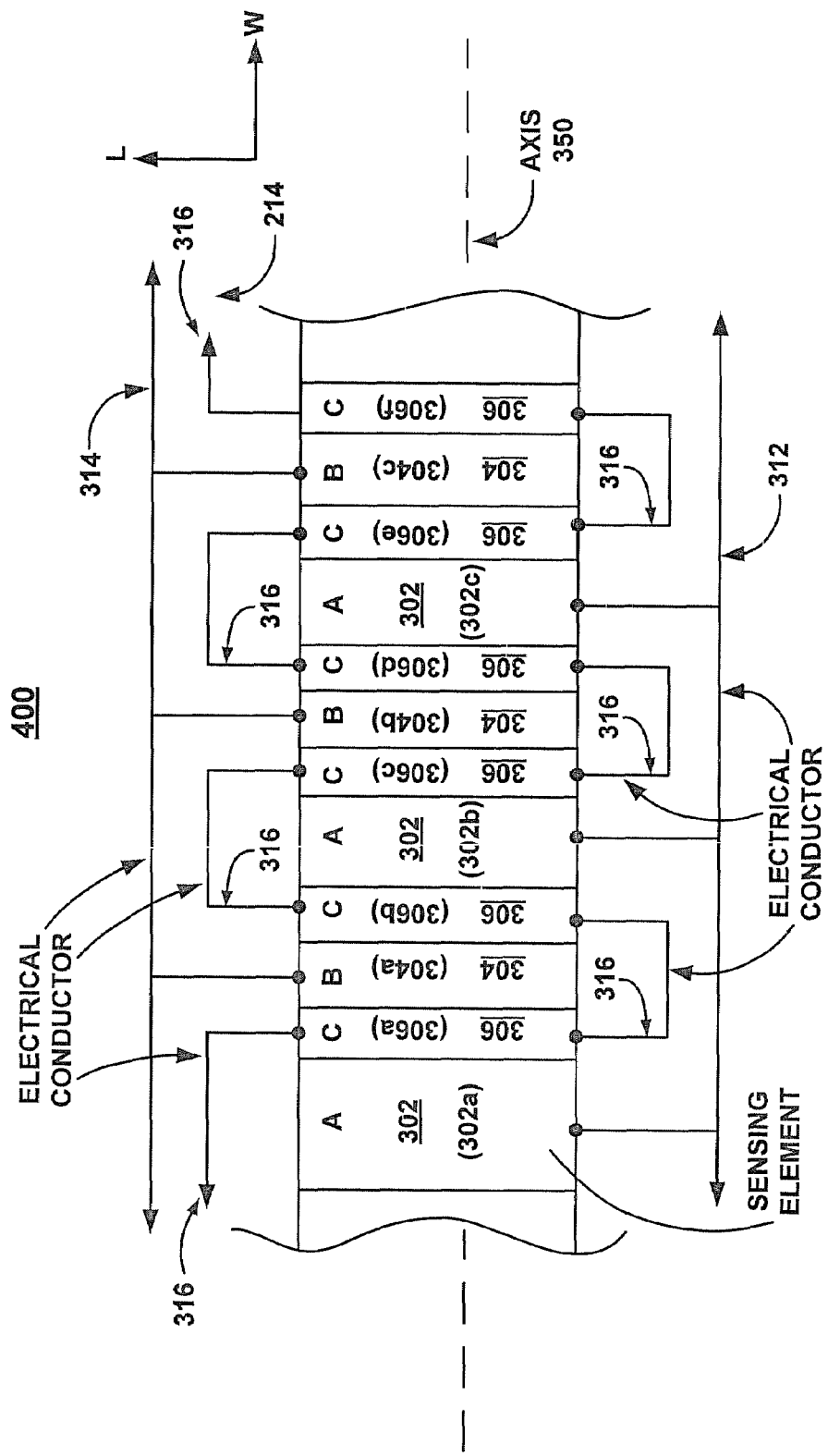
FIG. 4 is a block diagram of a portion of a capacitive sensing apparatus according to another embodiment of the present invention.

FIG. 4 is a block diagram of a portion of a capacitive sensing apparatus 400 according to another embodiment of the present invention. With reference also to FIG. 1, the portion of capacitive sensing apparatus 400 shown in FIG. 4 corresponds to a portion of sensing region 108, and electrical conductors 312, 314 and 316 correspond to (or are coupled to) electrical conductors 106.

The capacitive sensing apparatus 400 of FIG. 4 includes a number of sensing elements 302, 304 and 306. The sensing elements 302, 304 and 306 are arranged in a stripe-like manner. The set of sensing elements 302 is coupled to the same electrical conductor 312; the sensing elements 302 are also identified using the letter A. The set of sensing elements 304 is coupled to the same electrical conductor 314; the sensing elements 304 are also identified using the letter B. The set of sensing elements 306 is coupled to the same electrical conductor 316; the sensing elements 306 are also identified using the letter C. In the example of FIG. 4, the sensing elements 302, 304 and 306 are arranged in a repeating pattern (ACBC/ACBC/ . . . ).

In comparison to FIGS. 2 and 3, in which the electrical conductors 212, 214 and 216 overlap at various points, the electrical conductors 312, 314 and 316 of FIG. 4 do not overlap. Electrical conductor 312 connects the sensing elements 302 in parallel, and electrical conductor 314 connects the sensing elements 304 in parallel, while electrical conductor 316 connects the sensing elements 306 in series. In other words, an electrical path that includes electrical conductor 316 and sensing elements 306 zigzags between the sensing elements 302 and 304.

Because the sensing elements can be connected in the manner just described, the electrical conductors 312, 314 and 316 can be formed in the same layer and in the same step (or steps) of a fabrication process, thus simplifying the fabrication process. Also, by including the electrical conductors 312, 314 and 316 in the same single layer, the number of layers in the capacitive sensor apparatus can be reduced, reducing the amount of reflection that may seen from the surface if the apparatus is utilized as a touch sensor with a substantially transparent substrate.

Although three sets of sensing elements, coupled respectively to three electrical conductors, are described, the present invention is not so limited. For example, sensing elements can be arranged in a repeating ABCDCB/ABCDCB/ . . . pattern where the sensing elements identified using the letter D are coupled to the same electrical conductor. In a repeating ABCDCB/ABCDCB/ . . . pattern, the respective sets of sensing elements can be connected by non-overlapping electrical conductors as just described. That is, for example, the sensing elements in the set A can be connected in parallel, the sensing elements in the set B can be connected in series, the sensing elements in the set C can be connected in series, and the sensing elements in the set D can be connected in parallel. Given the examples described herein, other patterns of sensing elements with non-overlapping electrical conductors and more than four sets of sensing elements can be devised.

In the example of FIG. 4, the sensing elements in the set of sensing elements that is coupled to the electrical conductor 312 (e.g., sensing elements 302) have different widths (compared to other sensing elements in the set) and substantially the same length, and the sensing elements in the set of sensing elements that is coupled to the electrical conductor 314 (e.g., sensing elements 304) have different widths (compared to other sensing elements in the set) and substantially the same length, where the width dimension is indicated as W and the length dimension is indicated as L. For example, sensing element 302a is wider than sensing element 302b, which in turn is wider than sensing element 302c. Also, sensing element 304a is narrower than sensing element 304b, which in turn is narrower than sensing element 304c. In this respect, the sensing elements 302 and 304 are analogous to the sensing elements 202 and 204 of FIGS. 2 and 3.

The sensing elements 306 of FIG. 4 are also analogous in some respect to the sensing elements 206 of FIGS. 2 and 3. In the example of FIG. 4, relative to the example of FIG. 2, the total width of sensing elements 306a and 306b is essentially the same as the width of sensing element 206a; the total width of sensing elements 306c and 306d is essentially the same as the width of sensing element 206b; and the total width of sensing elements 306e and 306f is essentially the same as the width of sensing element 206c. Also, in one embodiment, the widths of sensing elements 306a and 306b are approximately the same, the widths of sensing elements 306c and 306d are approximately the same, and the widths of sensing elements 306e and 306f are approximately the same, although the present invention is not so limited. Also, in the example of FIG. 4, the combined width of sensing elements 306a and 306b is less than the combined width of sensing elements 306c and 306d, which in turn is less than the combined width of sensing elements 306e and 306f.

Figure 5:
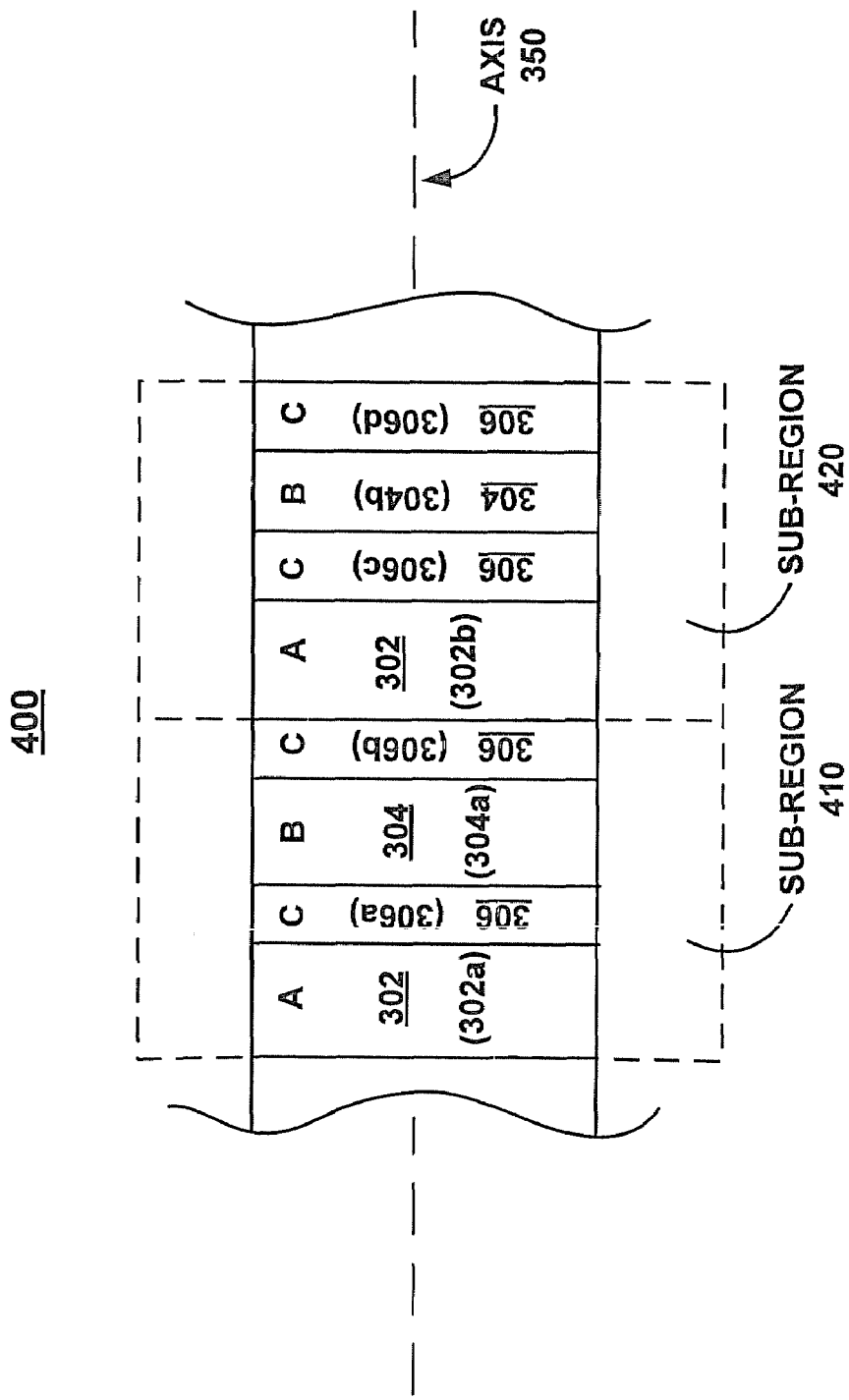
FIG. 5 is a block diagram of a portion of a capacitive sensing apparatus according to another embodiment of the present invention.

FIG. 5 is a block diagram of a portion of the capacitive sensing apparatus 400 according to another embodiment of the present invention. In the example of FIG. 5, the capacitive sensing apparatus 400 includes, in essence, a number of non-overlapping and contiguous cells or sub-regions such as sub-regions 410 and 420. The sub-regions 410 and 420 are abstractions that can be delimited in a different manner than shown by FIG. 5. In general, in the example of FIG. 5, a sub-region includes a group of contiguous sensing elements, where the group includes some number of the sensing elements 302 coupled to the same electrical conductor 312, that same number of the sensing elements 304 coupled to the same electrical conductor 314, and at least twice that same number of the sensing elements 306 coupled to the same electrical conductor 316. For example, sub-region 410 includes one each of the sensing elements labeled A and B and two of the sensing elements labeled C, and similarly sub-region 420 includes one each of the sensing elements labeled A and B and two of the sensing elements labeled C. Alternatively, a sub-region can be defined as including two or more of each of the sensing elements labeled A and B, and three or more of the sensing elements labeled C.

In one embodiment, the width of each sub-region 410 and 420 in capacitive sensing apparatus 400 is substantially the same from one sub-region to the next. Also, because in the example of FIGS. 4 and 5 each of the sensing elements 302, 304 and 306 has substantially the same length, the surface areas of the sub-regions 410 and 420 are essentially the same. By balancing the surface areas in this manner, each of the sub-regions 410 and 420 would be expected to have approximately the same total background measure (capacitance, current, voltage, etc.) if measured in the absence of an object (e.g., a user's finger or a probe), where the total background measure refers to the total (combined) measures of signal strength on all of the electrical conductors 312, 314 and 316.

As discussed above in conjunction with FIG. 3, the sub-regions 410 and 420 of FIG. 5 can also be defined to include a segment of each of the electrical conductors 312, 314 and 316 (FIG. 4). If the electrical conductors 312, 314 and 316 are not hidden (e.g., shielded or buried), an object in proximity to the sensing region may induce a capacitance not just in the sensing elements 302, 304 and 306 but also in the electrical conductors 312, 314 and 316. Thus, when considering the surface area of the sensing elements within a sub-region 410 or 420, the contribution of the electrical conductors 312, 314 and 316 may also be included. In one embodiment, the widths of the electrical conductors 312, 314 and/or 316 can be varied as a function of their lengths, so that each of the sub-regions 410 and 420 would be expected to have approximately the same total background measure (capacitance, current, voltage, etc.) if measured in the absence of an object.

In one embodiment, the widths of sensing elements in a pattern such as that exemplified in FIGS. 4 and 5 can be expressed as:

$$W_A = W_o + W_m * \sin(\theta);$$

$$W_B = W_o + W_m * \sin(\theta + 120 \text{ degrees}); \text{ and}$$

$$W_C = W_o + W_m * \sin(\theta + 240 \text{ degrees});$$

where $W_o$ and $W_m$ are constants and $W_A$ and $W_B$ are, respectively, the widths of the sensing elements 302 and 304 in a sub-region 410 or 420, and where $W_c$ is the combined width of the two sensing elements 306 that are in the same sub-region 410 or 420.

A position of an object (e.g., a finger or probe) along the axis 350 can be determined using the relative strengths of signals on the electrical conductors 312, 314 and 316. For example, if an object such as a user's finger is in proximity to (or in contact with) sensing apparatus 400, a capacitance (or current, voltage, etc.) above a background amount (which may be zero or negligible) is induced in some subset of the sensing elements 302, 304 and 306 and conducted via electrical conductors 312, 314 and 316 to sensing circuitry 110 (FIG. 1). The size of the subset depends on the relative sizes of the sensing elements and the object being sensed. The measures of the outputs on electrical conductors 312, 314 and 316 correspond to (e.g., are proportional to) the widths of the sensing elements 302, 304 and 306 in proximity to the object.

In one embodiment, the combination of widths of sensing elements in a sub-region of contiguous sensing elements is unique to that sub-region. That is, the combination of sensing element widths in a sub-region consisting of contiguous sensing elements 302a, 304a, 306a and 306b, for example, is unique to that sub-region. Note that, although in the examples of FIGS. 3 and 4 the sensing elements are arranged in a repeating ACBC pattern, in one embodiment the combination of widths of sensing elements is not repeated at other points along axis 350. That is, for example, the unique combination of sensing element widths in the sub-region consisting of contiguous sensing elements 302a, 304a, 306a and 306b does not appear elsewhere along axis 350. Therefore, in such an embodiment, an unambiguous position along the axis 350 can be determined using the respective measures of output on electrical conductors 312, 314 and 316, because the relative measures of the outputs on the electrical conductors 312, 314 and 316 correspond to the widths of the subset of sensing elements in proximity to the object, and because the widths of the subset of sensing elements in proximity to the object are unique to that particular subset and hence to a particular position among the entire set of sensing elements.

Although the examples of FIGS. 4 and 5 are discussed in the context of sensing elements of different widths, the present invention is not so limited. Sensing elements of different lengths and substantially the same width can instead be used to indicate position in a manner such as that described above. Also, sensing elements that have different surface areas can be used. Furthermore, sensing elements of substantially the same length and width, but at different distances (depths) from the sensing surface of sensing apparatus 400, can be used (see FIGS. 6A and 6B, for example). Moreover, sensing elements in which length, width and/or depth are varied can be used.

Also, although the examples of FIGS. 4 and 5 are described for sensing elements that continuously increase or decrease in size (e.g., width) from left-to-right (with respect to the orientation of FIGS. 4 and 5), the present invention is not so limited. The sensing elements can be arranged differently based on their sizes such that the combination of sizes of sensing elements in any sub-region of contiguous sensing elements is unique to that group, while also paying heed to the aforementioned repeating (e.g., ACBC) pattern.

Figure 6A:
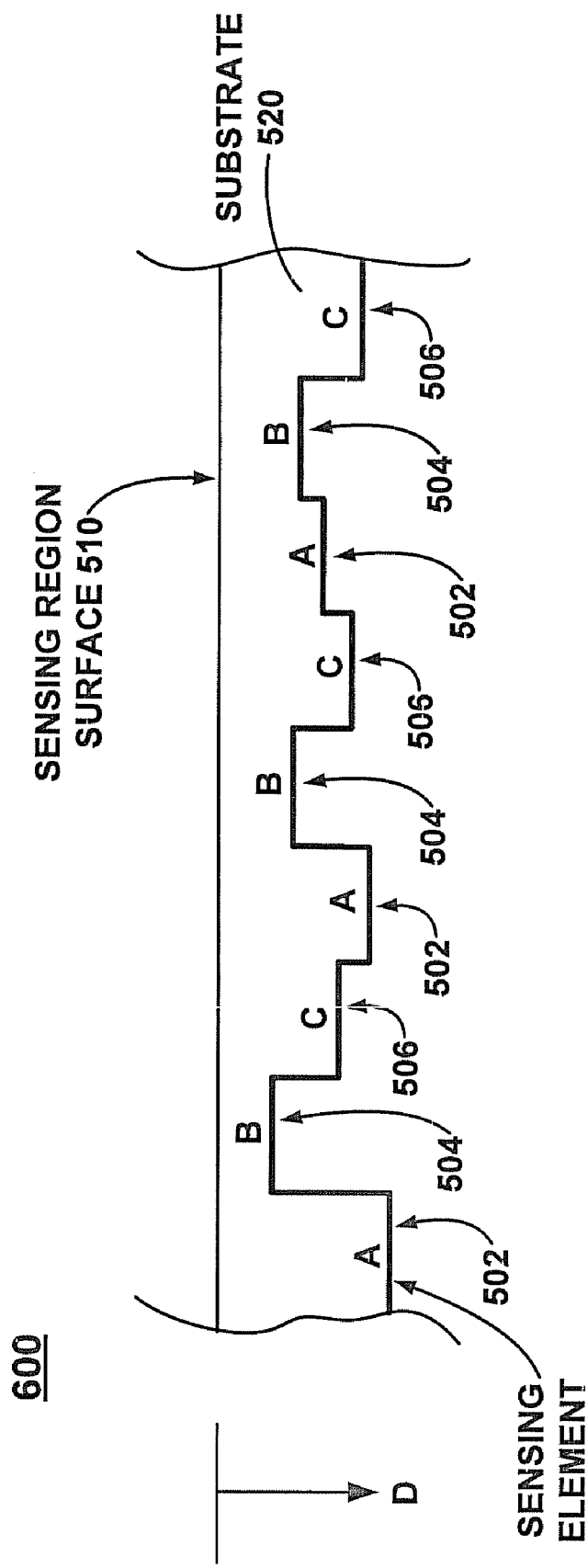
FIGS. 6A and 6B are block diagrams showing different perspectives of a portion of a capacitive sensing apparatus according to another embodiment of the present invention.
Figure 6B:
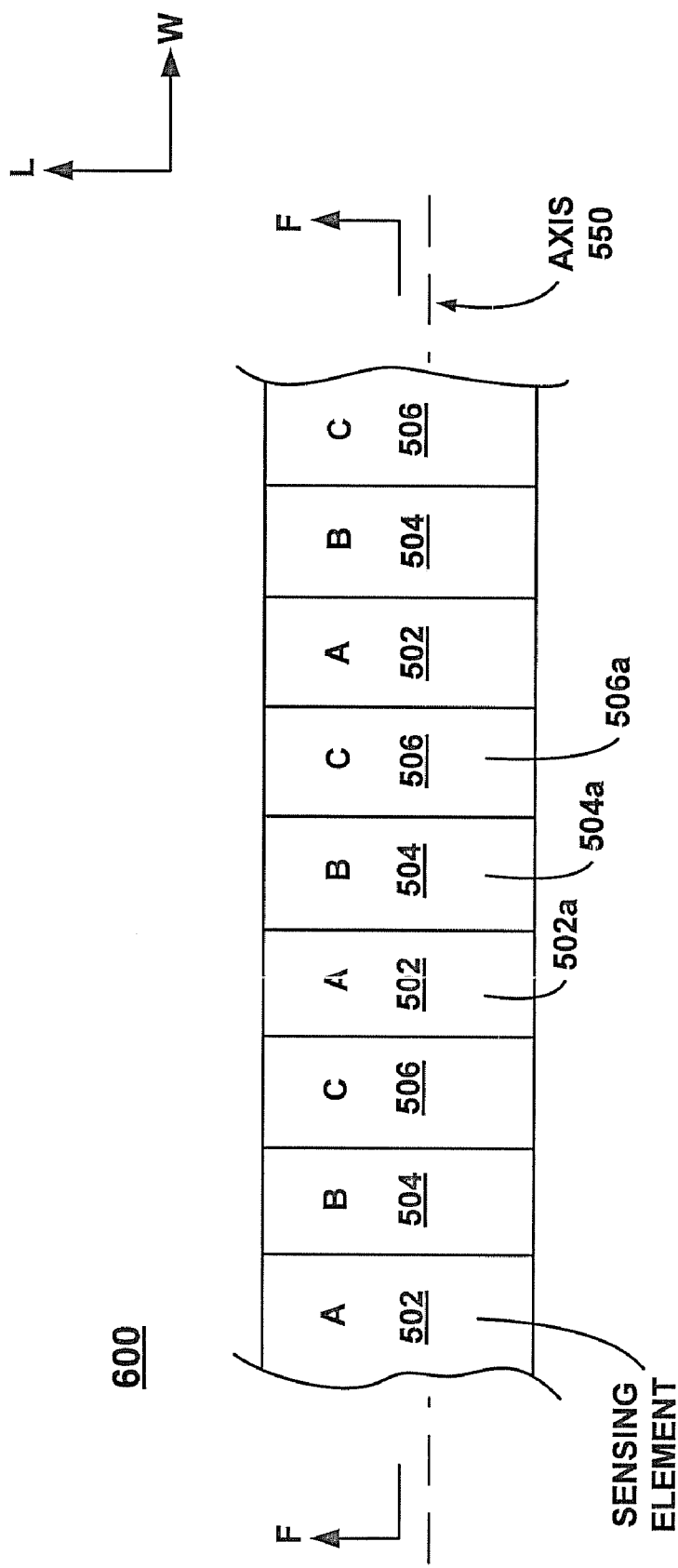

FIGS. 6A and 6B are block diagrams showing different perspectives of a portion of a capacitive sensing apparatus 600 according to another embodiment of the present invention. FIG. 6A is a view along cross-section F-F of FIG. 6B. With reference also to FIG. 1, the portion of capacitive sensing apparatus 600 shown in FIG. 6B corresponds to a portion of sensing region 108.

The capacitive sensing apparatus 600 of FIGS. 6A and 6B includes a number of sensing elements 502, 504 and 506. The sensing elements 502, 504 and 506 are arranged in a stripe-like manner. In one embodiment, the sensing elements are coupled to electrical conductors (not shown) in the same fashion as described above in conjunction with FIG. 2. That is, the set of sensing elements 502 is coupled to the same electrical conductor; the sensing elements 502 are also identified using the letter A. The set of sensing elements 504 is coupled to the same electrical conductor; the sensing elements 504 are also identified using the letter B. The set of sensing elements 506 is coupled to the same electrical conductor; the sensing elements 506 are also identified using the letter C. In the example of FIGS. 6A and 6B, the sensing elements 502, 504 and 506 are arranged in a repeating pattern (ABC/ABC/ ... ). Although three sets of sensing elements, coupled respectively to three electrical conductors, are described, the present invention is not so limited.

In the example of FIGS. 6A and 6B, the sensing elements 502, 504 and 506 have substantially the same widths and lengths, where the width dimension is indicated as W and the length dimension is indicated as L. However, as shown in FIG. 6A, the sensing elements 502, 504 and 506 are buried or formed in substrate 520 at different distances or depths D relative to sensing region surface 510.

In the example of FIG. 6B, the sensing elements 502 are at different depths relative to one another, the sensing elements 504 are at different depths relative to one another, and the sensing elements 506 are at different depths relative to one another. In one embodiment, the depths of sensing elements in a pattern such as that exemplified in FIGS. 6A and 6B can be expressed as:

$D_A = D_o + D_m * \sin(\theta)$;

$D_B = D_o + D_m * \sin(\theta + 120 \text{ degrees})$; and $D_C = D_o + D_m * \sin(\theta + 240 \text{ degrees})$;

where $D_o$ and $D_m$ are constants and $D_A$, $D_B$ and $D_C$ are the widths of sensing elements 502, 504 and 506, respectively.

A position of an object (e.g., a finger or probe) along the axis 550 can be determined using the relative strengths of signals on the electrical conductors coupled to the sensing elements 502, 504 and 506. For example, if an object such as a user's finger is in proximity to (or in contact with) sensing apparatus 600, a capacitance (or current, voltage, etc.) above a background amount (which may be zero or negligible) is induced in some subset of the sensing elements 502, 504 and 506. The size of the subset depends on the relative sizes of the sensing elements and the object being sensed. The measures of the outputs on the electrical conductors (not shown) correspond to (e.g., are proportional to) the depths of the sensing elements 502, 504 and 506 in proximity to the object.

In one embodiment, the combination of depths of sensing elements in a group of contiguous sensing elements is unique to that group, no matter how that group is delimited. That is, the combination of sensing element widths in a group consisting of contiguous sensing elements 502a, 504a and 506a, for example, is unique to that group and does not appear elsewhere along axis 550. Therefore, in such an embodiment, an unambiguous position along the axis 550 can be determined using the respective measures of output on the electrical conductors coupled to the sensing elements 502, 504 and 506, because the relative measures of the outputs on the electrical conductors correspond to the depths of the subset of sensing elements in proximity to the object, and because the depths of the subset of sensing elements in proximity to the object are unique to that particular subset and hence to a particular position among the entire set of sensing elements.

As an alternative to forming the sensing elements 502, 504 and 506 in substrate 520 at various depths relative to sensing region surface 510, the characteristics of the substrate 520 can be adjusted to simulate that effect. For example, sensing elements 502a and 504a can be formed in substrate 520 at the same distance from sensing regions surface 510; however, the characteristics (e.g., material properties) of substrate 520 can be locally adjusted such that an object that is equidistant from sensing elements 502a and 504a induces a capacitance in sensing element 502a that is less than a capacitance induced in sensing element 504a.

FIG. 7 is a flowchart 700 of a method that can be implemented using a capacitive sensing apparatus according to an embodiment of the present invention. Although specific steps are disclosed in flowchart 700, such steps are exemplary. That is, the present invention is well-suited to performing various other steps or variations of the steps recited in flowchart 700. It is appreciated that the steps in flowchart 700 may be performed in an order different than presented and that the steps in flowchart 700 are not necessarily performed in the sequence illustrated.

In block 710, in one embodiment, a first measure of a sensor signal that is output on a first electrical conductor coupled to different-sized first sensing elements is received, where the first measure corresponds to the sizes of the first sensing elements in sensing range of the object.

In block 720, in one embodiment, a second measure of a sensor signal that is output on a second electrical conductor coupled to different-sized second sensing elements is received, where the second measure corresponds to the sizes of the second sensing elements in sensing range of the object.

In block 730, in one embodiment, a third measure of a sensor signal that is output on a third electrical conductor coupled to different-sized third sensing elements is received, where the third measure corresponds to the sizes of the third sensing elements in sensing range of the object.

In one embodiment, the first sensing elements, the second sensing elements and the third sensing elements of blocks 710, 720 and 730 are arranged stripe-like in a repeating pattern along an axis in the sensing region.

In block 740, in one embodiment, an unambiguous position along the axis is determined using the first, second and third measures.

In conclusion, embodiments in accordance with the present invention pertain to capacitive sensing apparatuses that can simplify fabrication processes and/or can sense position unambiguously.

The various capacitive sensing apparatuses described herein can each include a non-conductive region formed by two or more adjacent sensing elements. Furthermore, the various capacitive sensing apparatuses described herein may each be operated with very few sensor channels. This can offer substantial cost savings if there is a desire to use a low pin-count package, or build a simplified sensor ASIC (application-specific integrated circuit) for a capacitive sensor device or apparatus.

Moreover, the various sensor patterns described herein can each provide a capacitive sensing geometry that does not induce signal-to-noise ratio concerns, because the sensing elements in those patterns do not cross over one another. Additionally, the capacitive sensing apparatuses may each be used to detect objects on either side of the substrate onto which it is fabricated. To prevent detection of signals or noise from one side of the substrate, a ground plane or a driven shield conductor may be utilized to shield that side.

In addition, the features of the various embodiments described herein can be used alone or in combination. That is, for example, the features described for one embodiment of a sensor pattern may be appropriately combined with the features described for another embodiment of a sensor pattern.

Also, in addition to determining position, or as an alternative to determining position, embodiments of the capacitive sensing apparatuses described herein can be used to detect movement, or a rate of movement, of an object or finger relative to a sensing region.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A capacitance sensing apparatus for sensing an object proximate to a sensing region, said apparatus comprising:
   a plurality of different-sized first sensing elements coupled to a first electrical conductor, wherein a first measure of a sensor signal output on said first electrical conductor corresponds at least in part to the size of a first sensing element proximate to said object;
   a plurality of different-sized second sensing elements coupled to a second electrical conductor, wherein a second measure of a sensor signal output on said second electrical conductor corresponds at least in part to the size of a second sensing element proximate to said object; and
   a plurality of different-sized third sensing elements coupled to a third electrical conductor, wherein a third measure of a sensor signal output on said third electrical conductor corresponds at least in part to the size of a third sensing element proximate to said object;
   wherein said first sensing elements, said second sensing elements and said third sensing elements are arranged stripe-like in a repeating pattern along an axis in said sensing region and wherein said first, second and third measures together indicate an unambiguous position along said axis.

2. The apparatus of claim 1 wherein said repeating pattern comprises in order:
   a one of said first sensing elements;
   a one of said second sensing elements; and
   a one of said third sensing elements.

3. The apparatus of claim 1 wherein said repeating pattern comprises in order:
   a one of said first sensing elements;
   a one of said third sensing elements;
   a one of said second sensing elements; and
   another one of said third sensing elements.

4. The apparatus of claim 1 wherein said sensing region comprises a plurality of non-overlapping sub-regions, each of said sub-regions comprising:
   a plurality of contiguous sensing elements comprising a number of said first sensing elements, a number of said second sensing elements, and a number of said third sensing elements; and
   a segment of each of said first, second and third electrical conductors;
   wherein total capacitance within each of said sub-regions, if measured in the absence of an object proximate to said sensing region, is approximately equal for each of said sub-regions.

5. The apparatus of claim 1 wherein said sensing region comprises a plurality of non-overlapping sub-regions, each of said sub-regions comprising a plurality of contiguous sensing elements comprising a number of said first sensing elements, a number of said second sensing elements, and a number of said third sensing elements; wherein said sub-regions are each approximately equal in width, wherein width is measured in the direction of said axis.

6. The apparatus of claim 1 wherein said first sensing elements comprise elements having different widths, said second sensing elements comprise elements having different widths, and said third sensing elements comprise elements having different widths.

7. The apparatus of claim 1 wherein said first sensing elements comprise elements having different lengths and said second sensing elements comprise elements having different lengths.

8. The apparatus of claim 1 wherein said first, second and third sensing elements vary in depth relative to a surface of said sensing region.

9. The apparatus of claim 1 wherein said third electrical conductor varies in size according to the different sizes of said first and second sensing elements.

10. A method of sensing an object proximate to a sensing region, said method comprising:
   receiving a first measure of a sensor signal that is output on a first electrical conductor coupled to a plurality of different-sized first sensing elements, wherein said first measure corresponds to the sizes of said first sensing elements in sensing range of said object;
   receiving a second measure of a sensor signal that is output on a second electrical conductor coupled to a plurality of different-sized second sensing elements, wherein said second measure corresponds to the sizes of said second sensing elements in sensing range of said object;
   receiving a third measure of a sensor signal that is output on a third electrical conductor coupled to a plurality of different-sized third sensing elements, wherein said third measure corresponds to the sizes of said third sensing elements in sensing range of said object, wherein said first sensing elements, said second sensing elements and said third sensing elements are arranged stripe-like in a repeating pattern along an axis in said sensing region; and
   identifying an unambiguous position along said axis using said first, second and third measures.

11. The method of claim 10 wherein said repeating pattern comprises, in order, a one of said first sensing elements, a one of said second sensing elements, and a one of said third sensing elements.

12. The method of claim 10 wherein said repeating pattern comprises, in order, a one of said first sensing elements, a one of said third sensing elements, a one of said second sensing elements, and another one of said third sensing elements.

13. The method of claim 10 wherein said sensing region comprises a plurality of non-overlapping sub-regions, each of said sub-regions comprising:
   a plurality of contiguous sensing elements comprising a number of said first sensing elements, a number of said second sensing elements, and a number of said third sensing elements; and
   a segment of each of said first, second and third electrical conductors;
   wherein total capacitance within each of said sub-regions, if measured in the absence of an object proximate to said sensing region, is approximately equal for each of said sub-regions.

14. The method of claim 10 wherein said sensing region comprises a plurality of non-overlapping sub-regions, each of said sub-regions comprising a plurality of contiguous sensing elements comprising a number of said first sensing elements, a number of said second sensing elements, and a number of said third sensing elements; wherein said sub-regions are each approximately equal in width, wherein width is measured in the direction of said axis.

15. The method of claim 10 wherein said first sensing elements comprise elements having different widths, said second sensing elements comprise elements having different widths, and said third sensing elements comprise elements having different widths.

16. The method of claim 10 wherein said third electrical conductor has a width that varies according to the different sizes of said first and second sensing elements.

17. The method of claim 10 wherein said first sensing elements comprise elements having different lengths and said second sensing elements comprise elements having different lengths.

18. The method of claim 10 wherein said first, second and third sensing elements vary in depth relative to a surface of said sensing region.

* * * * *